UNITED STATES PATENT OFFICE.

CHARLES PFANNENSTIEHL, OF MEMPHIS, TENNESSEE.

IMPROVEMENT IN CORKS FOR BOTTLING BEER AND SIMILAR LIQUIDS.

Specification forming part of Letters Patent No. 171,315, dated December 21, 1875; application filed October 27, 1875.

*To all whom it may concern:*

Be it known that I, C. PFANNENSTIEHL, of the city of Memphis, in the county of Shelby and State of Tennessee, have invented a new and useful Improvement in Bottling Beer, which improvement is set forth in the following specification:

The method heretofore employed of bottling beer and similar liquids has been to fill the bottle to the neck with the liquid, and thus leave between the liquid and the cork a space of about one inch and a half long. This space was naturally filled with air, and consequently the carbonic-acid gas in the beer, when mixed with this air, soon produced a disagreeable taste.

Another method of bottling beer, at present in use, is this: the bottles are filled and corked, as usual, with an air-space between the cork and liquid. After bottling in this way, the bottles are heated by steam or hot water to a certain degree, but without avoiding the disagreeable result already named.

This unsatisfactory way of bottling beer led me to make numerous experiments in order to discover an improved method, and thereby produce a better article of bottled beer in the market.

The invention accordingly now described, and which I seek to secure by Letters Patent, consists as follows: First, I prepare the cork to be used by dipping or steeping it in olive or other sweet oil, in order to render it sufficiently elastic; second, I fill the bottle entirely full with the liquid, and then I force the so prepared cork into the neck of the bottle, and necessarily the liquid also, with any common corking-machine.

The pressure of the cork upon the beer produces immediately the evolution of the carbonic-acid gas, and as there is no air in the bottle, the carbonic-acid gas cannot come in contact with the same; and, further, owing to the natural rigidity, and at the same time partial elasticity, of the cork, resulting from its saturation with the oil, and its consequent elongation when pressed against the liquid, the latter is first forced up, and then allowed to escape. There is no danger of the bottle bursting, as would otherwise be the case.

The beer is ready for use at once, as soon as the bottle is corked, and continues in this fresh condition for any length of time.

After repeated trials this simple process has proved entirely satisfactory and certain in its results.

What I claim as my invention in the process of bottling beer and similar liquids is—

As a new article of manufacture, a cork saturated with olive or other sweet oil, in order to render it sufficiently elastic to be forced in the neck of the bottle and the beer or other similar liquids, substantially as and for the purpose described.

C. PFANNENSTIEHL.

Witnesses:
J. W. PILLING,
JAS. N. McINTOSH.